United States Patent [19]

Thomas, Jr.

[11] Patent Number: 4,706,530

[45] Date of Patent: Nov. 17, 1987

[54] SPINNER APPARATUS AND METHOD

[76] Inventor: Haywood Thomas, Jr., 41 Mansion Rd., Tabb, Va. 23692

[21] Appl. No.: 897,956

[22] Filed: Aug. 19, 1986

[51] Int. Cl.[4] .................................................. B23B 33/00
[52] U.S. Cl. ....................................... 82/40 R; 82/41; 269/156; 279/83; 279/1 L
[58] Field of Search ................... 82/40 R, 41, 45; 279/83, 1 L; 269/156

[56] References Cited

U.S. PATENT DOCUMENTS

| | | |
|---|---|---|
| 768,454 | 8/1904 | Hill . |
| 913,594 | 2/1909 | Wehner . |
| 1,849,539 | 3/1932 | Branigan . |
| 2,027,174 | 1/1936 | Johnson ................................ 82/41 |
| 2,092,997 | 9/1937 | Wilson ................................. 82/41 |
| 2,329,488 | 9/1943 | Seawright ............................. 82/41 |
| 2,367,045 | 1/1945 | Nightingale ...................... 82/40 R |
| 2,545,050 | 3/1951 | Schurr ............................. 82/40 R |
| 3,059,897 | 10/1962 | Jensen ............................. 251/306 |
| 3,410,520 | 11/1968 | Mahoney ......................... 251/173 |
| 3,561,304 | 2/1971 | Bachmann ...................... 82/40 R |
| 3,593,605 | 7/1971 | Cudnohufsky ................. 82/40 R |
| 3,605,533 | 9/1971 | Dugle .............................. 82/40 R |
| 4,165,662 | 8/1979 | Besenbruch et al. ............. 82/4 A |

*Primary Examiner*—Nicholas P. Godici
*Assistant Examiner*—Jerry Kearns
*Attorney, Agent, or Firm*—Griffin, Branigan, & Butler

[57] ABSTRACT

A butterfly-valve disc (10) is reconstituted by applying welding metal about its edge, rotating the disc with a lathe, and working the disc edge with a lathe tool. A spinner apparatus adapts the butterfly valve disc to be turned on the lathe. The spinner apparatus comprises two spinner mechanisms (A and B) for respectively attaching to opposite sides of the disc. Each of the spinner mechanisms includes a block (38), an elongated centering shaft (42) slidably mounted on the block, a spinner bar (48) fastened to the block for extending into a boss hole (22 or 24) on a side of the valve disc on which the spinner mechanism is to be mounted, and aligning bars (70 and 72) attached to the block for making contact with the side of the valve disc on which the spinner mechanism is to be mounted for holding a valve-disc axis (88) aligned with an axis (43) of the centering shaft.

5 Claims, 4 Drawing Figures

SPINNER APPARATUS AND METHOD

BACKGROUND OF THE INVENTION

This invention relates generally to the art of butterfly valves, and more specifically, to apparatus and a method for reconstituting skewed-axis butteryfly valves.

Skewed-axis butterfly valves of the type with which this invention is used, depicted in FIGS. 1-3, are in common use throughout industry and are often used on ships.

Heretofore, some discs of these valves have been made with replaceable O-rings in perimeter grooves so that the O-rings could be periodically replaced without replacing the whole discs. However, many extremely corrosive applications of such valves do not allow the use of perimeter O-rings but rather require that the discs be made totally of metal. As in the case of valves with O-rings, the metal discs also corrode at their perimeters. Heretofore, it has been possible to throw away the corroded discs of such valves and replace them with new discs. However, the manufacturers of such discs often do not stock them so they are often difficult to purchase in a timely manner. Further, such butterfly-valve discs are extremely expensive. Thus, some users of skewed-axis butterfly valves have repaired the discs by welding metal about their outer perimeters and then filing the outer perimeters to form new, appropriately-shaped perimeter surfaces. Although some money can be saved using this procedure, the procedure is time consuming and inexact. To date there is no relatively easy, exact and economical way to reconstitute these all-metal, skewed-axis, butterfly valve discs. Thus, it is an object of this invention to provide apparatus and a method for reconstituting all-metal skewed-axis butterfly valve discs which is economical, fast, exact and relatively easy to perform.

It is a further object of this invention to provide such a method of reconstituting skewed-axis butterfly valves which allows the butterfly-valve discs thereof to be quickly, and smoothly, worked on a lathe.

SUMMARY

According to principles of this invention, skewed-axis butterfly valves are reconstituted by removing them from their valve housings, adding weld metal about their peripheral, or perimeter edges, and working these edges with a lathe in order to restore them to their proper configurations.

One is enabled to carry out this method by using a spinner apparatus for adapting butterfly valve discs to be turned on a lathe. The spinner apparatus includes two spinner mechanisms each of which contains a block, an elongated centering shaft slidably mounted on the block for engaging a butterfly-valve disc in the center thereof, a spinner bar with an attached balancing shaft for extending into a boss hole on the side of the valve disc on which the spinner mechanism is mounted, and an aligning bar mechanism attached to the block for making contact with the sides of the valve disc on which the spinner mechanism is mounted for aligning the valve disc axis with the axis of the centering shaft. Outer ends of the centering shafts of spinner mechanisms attached to opposite sides of a valve disc are mounted in a lathe for rotating the valve disc. The balancing shafts include devices for gripping the sides of valve bosses for holding the balancing shafts in holes in the bosses.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
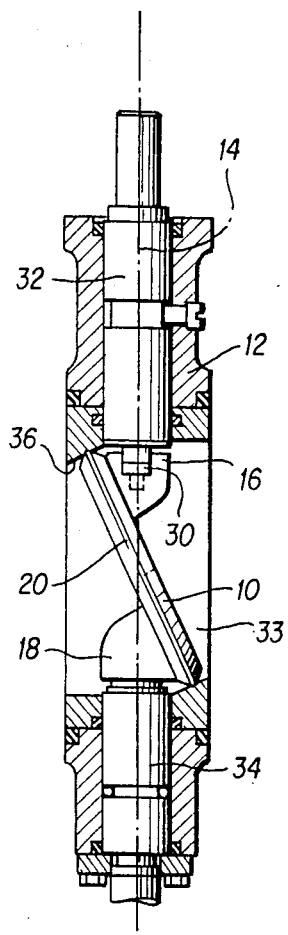
FIG. 1 is a side, partially in section, view of a skewed-axis butterfly valve mounted in its housing.
Figure 2:
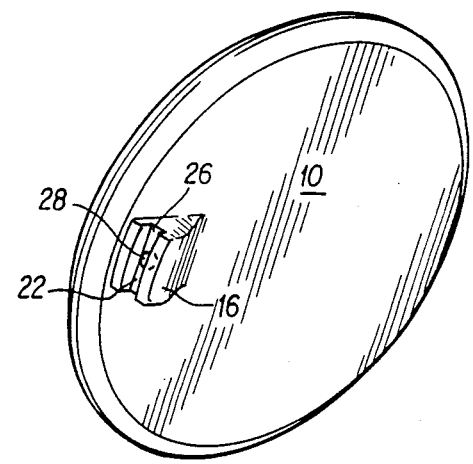
FIG. 2 is a top view of the butterfly-valve disc of FIG. 1.
Figure 3:
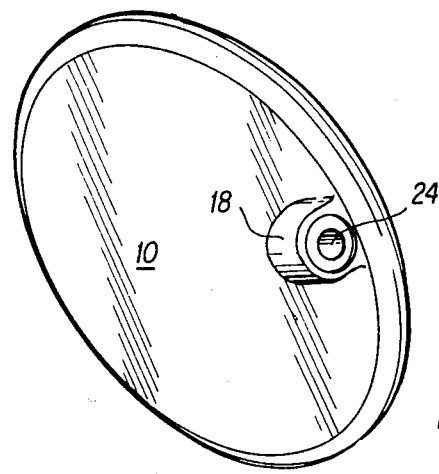
FIG. 3 is a bottom view of the butterfly-valve disc of FIG. 1.

FIG. 1 shows a scewed-axis butterfly valve disc 10 mounted in a valve housing 12. This valve is referred to as a skewed-axis butterfly valve disc because the plane of the round disc 10 is skewed at an angle of about 25° to an axis 14 about which the disc 10 rotates. In this respect, the disc 10 has integral therewith an operator boss 16 and a mounting boss 18 respectively formed on opposite sides thereof at approximately opposite positions along a perimeter edge 20. These bosses 16 and 18 respectively have an operating hole 22 (FIG. 2) and a mounting hole 24 (FIG. 3) formed therein for respectively receiving shafts mounted on opposite sides of the valve housing 12. The operating hole 22 of the operating boss 16 includes an elongated slot 26 and a countersunk round guiding hole 28 which receive correspondingly shaped male protrusions 30 from an operator shaft 32. The elongated slot 26, by mating with a similarly formed male protrusion, provides positive rotative engagement between the operator shaft 32 and the operating boss 16 so that when the operator shaft 32 is rotated, the butterfly-valve disc 10 will also be rotated about the axis 14 to open and close a passage 33. The mounting hole 24 is round to receive a round protrusion from a mounting stud 34 which allows the mounting boss 18 and the attached butterfly-valve disc 10 to freely rotate about the mounting stud 34 on the axis 14.

In the use of this valve, the perimeter edge 20 of the valve makes contact with a valve seat 36 of the valve housing 12. It is about this perimeter edge 20 that the butterfly-valve disc 10 tends to corrode. In order to reconstitute this perimeter edge when unacceptable corrosion has occurred, welding material is welded to this outer perimeter edge 20 and the valve disc 10, with its integral operator and mounting bosses 16 and 18, are mounted on a lathe so that this perimeter edge can be worked with a lathe tool.

Figure 4:
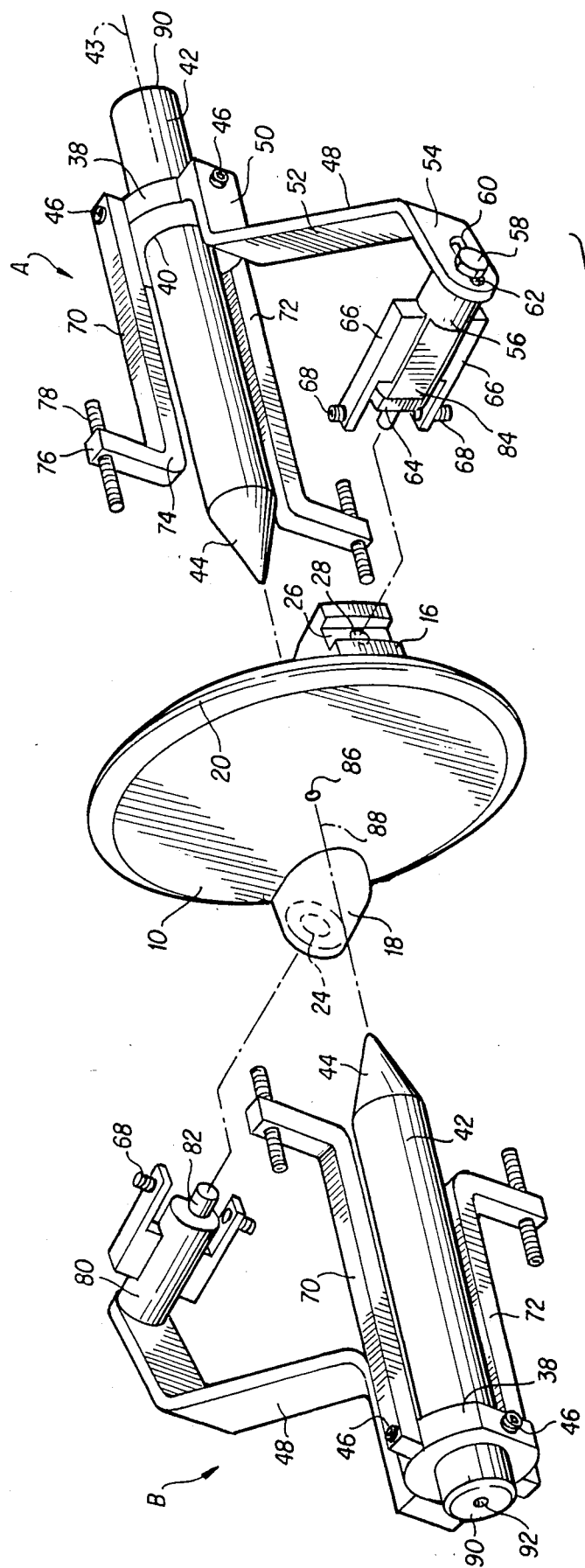
FIG. 4 is an isometric, exploded, view of a spinner mechanism of this invention mounted on a skewed-axis butterfly-valve disc.

A spinner apparatus for mounting the valve disc 10 on a lathe comprises first and second spinner mechanisms A and B. As can be seen in FIG. 4, these spinner mechanisms A and B are mounted on opposite sides of the butterfly-valve disc 10 and their elements are almost identical. For ease of description, spinner mechanism A will be described and then the differences between spinner mechanism A and spinner mechanism B will be described. In FIG. 4, identical elements between the spinner mechanism are given identical numbers.

All of the elements of the spinner apparatus are constructed of metal. A ½ inch thick block 38 has a 1.005 inch bore 40 therethrough in which is positioned a 1 inch diameter centering shaft 42 having a centering-shaft axis 43. The centering shaft is approximately 6 inches long and its inner end has a 45° point 44 thereon. The centering shaft 42 can be selectively slid in the bore 40 or fixed relative to the block 38 by means of set screws 46 which are placed about the block 38 at 90° intervals.

Welded to the block 38 is a flat spinner bar 48 having a first section 50 parallel to the centering shaft 42, a second section 52 on about an 80° angle to the centering shaft 42 and a third section 54 which forms approximately a 30° angle to the centering shaft 42. A 1 inch diameter balancing shaft 56 is attached to the third section 54 by means of a cap screw 58 passing through a slot 60 in the third section 54 which threadingly engages a hole in the end of the balancing shaft 56. A mounting end 62 of the balancing shaft 56 is cut on approximately a 10° angle with its axis so that the balancing shaft 56 is not perpendicular to the third section 54, but rather is at approximately an 80° angle thereto. An outer-end portion 64 of the balancing shaft 56 has a shape for fitting snugly into both the round guiding hole 28 and the elongated slot 26 of the operator boss 16 of the valve disc 10. The outer-end portion 64 extends along an axis which forms an angle of about 25° with the plane of a disc 10 in which it is mounted, the same as the axis 14 of the operator shaft 32 in FIG. 1. Balancing shaft retainers 66 are attached to opposite sides of the balancing shaft 56 and extend outwardly on opposite sides of the outer-end portion 64. These extensions of the balancing-retainers 66 have set screws 68 therein which can be tightened and loosened to engage opposite sides of the operator boss 16 when the outer-end portion 64 is engaged with the guiding hole 28 and enlongated slot 26 of the boss 16.

Opposite aligning bars 70 and 72 are welded to the block 38, each is respectively removed approximately 90° about the block 38 from the center of the flat spinner bar 48 in an opposite direction than the other. The aligning bars 70 and 72 are approximately 6 inches long and are constructed of ⅜ inch square metal bars. Each of these aligning bars has a 90° bend 74 therein to form a foot 76 with a set screw 78 being approximately parallel to the axis 43 of the centering shaft 42.

The spinner mechanism B differs from the spinner mechanism A in that a balancing shaft 80 of the mechanism B has an outer end 82 which is shaped differently from the outer end 64 of the balancing shaft 56. In this regard, the outer end 82 is cylindrically shaped to securely fit in the mounting hole 24 of the mounting boss 18. It should be noted that the mounting hole 24 is quite a bit larger than the guiding hole 28 of the operator boss 16, thus, that portion of the outer end 64 which fits into the guiding hole 28 is of a different diameter than the outer end 82 of the balancing shaft 80.

Each of the balancing shafts 56 and 80 have a 1/16 inch slice 84 taken from the surface thereof facing the disc 10 on which the spinner mechanism is to be mounted near the respective outer ends 64 and 82 thereat. This slice 84 has the purpose of providing additional space between the respective balancing shafts 56 and 80 and the perimeter edge 20 of the disc 10 to allow a lathe tool to be used on the parameter edge 20.

In operation of the spinner apparatus of FIG. 4, a butterfly-valve disc 10 is removed from its housing 12 and if there are none there, dents 86 are made at center points on opposite sides of the disc 10 (only one shown in FIG. 4). Weld material is welded about the disc's perimeter edge 20. The outer-end portions 64 and 82 of the balancing shafts 56 and 80 are respectively inserted into operating and mounting holes 22 and 24 of the operator and mounting bosses 16 and 18 and the retainer set screws 68 are tightened on the sides of the bosses 16 and 18 to hold these end portions in the boss holes. The centering shafts 42 are slid in the bores 40 of their respective blocks 38 so that the tips of their points 44 are inserted into the center dents 86 on opposite sides of the disc 10. The set screws 46 and 78 as well as the cap screw 58 are then adjusted to approximately align the centering-shaft axis 43 with a disc axis 88 passing through the center dents 86. In this regard, by adjusting the positions of the balancing shafts 56 and 80 in the slots 60 relative to the third section 54 prior to fastening the cap screw 58, by slidingly adjusting the position of the centering shaft 42 relative to the block 38 before tightening the set screws 46, and by adjusting the set screws 78 to be in contact with the respective sides of the disc on which the respective spinner mechanisms are mounted, the spinner mechanisms are tightly mounted onto opposite sides of the valve disc 10 with the centering shaft axes 43 being in approximate alignment with the axis 88 of the disc valve 10. Such an orientation can be checked once the assembly is mounted on a lathe and can be adjusted using the various set screws and the cap screw 58. It should be understood, that the tips of the points 44 of the centering shafts 42 should be in contact with center dents 86 on opposite sides of the disc 10 when the spinner mechanisms A and B are properly mounted on the disc 10. The respective bends of the flat spinner bar 48 and the non-perpendicular cut of the mounting end 62 of the balancing shafts 56 and 80 allow the outer ends 64 and 80 to be inserted into the operating and mounting holes 22 and 24 of the operating and mounting bosses 16 and 18.

Outer ends 90 of the centering shafts 42 are then engaged by lathe engaging elements. In this respect, each of the centering shafts 42 has a center indentation 92 in the outer end thereof which is engaged by a center (not shown) of a lathe engaging element. The lathe is then rotated by hand to check for any wobble in the disc caused by non-squareness of the centering shafts 42 and if there is any it is corrected by adjusting the set screws 78 and the cap screw 58. The lathe then rotates the entire assembly including both spinner mechanisms and the disc valve 10 which rotates smoothly and allows the use of a lathe tool to work its perimeter outer edge 20 for thereby reforming this outer edge so that the valve can again be mounted in the housing 12 for further use.

It will be appreciated by those of ordinary skill in the art that the method of reconstituting skewed-axis butterfly valves and the spinner apparatus of this invention provide an inexpensive, noncomplicated manner in which skewed-axis butterfly valves can be reconstituted.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A spinner apparatus for adapting a butterfly-valve disc to be turned on a lathe, said butterfly-valve disc being of a type having first and second axially protruding mounting bosses respectively positioned on opposite sides thereof at approximately opposite positions along a perimeter edge thereof, said bosses each having a close-to radially-directed boss hole for receiving mounting shafts, said spinner apparatus comprising two spinner mechanisms for respectively attaching to opposite sides of said butterfly-valve disc, each to be engaged by a lathe mount, each of said mechanisms comprising:
a block;
an elongated centering shaft mounted on said block, said block including means for holding said shaft affixed to said block, an inner end of said shaft adapted for contacting said disc approximately at its center and an outer end adapted to be engaged by a lathe for rotating said disc;
a spinner-bar means fastened to said block having balancing means for extending into said boss hole on the side of said valve disc on which said spinner mechanism is mounted, said spinner-bar means including means for adjusting the position of said balancing means relative to said block;
aligning bar means attached to said block for making contact with the side of said valve disc on which said spinner mechanism is mounted at positions removed from said boss for helping to hold said valve disc with its axis aligned with the axis of said centering shaft, said aligning bar means including means for adjusting locations of contact points between it and said disc relative to said block;
whereby when said spinner apparatus is attached to a valve disc, outer ends of said elongated centering shafts can be engaged by a lathe for turning it to work its perimeter edge with a lathe tool.

2. A spinner apparatus as in claim 1, wherein said balancing means of one of said spinner mechanisms is different from the means of the other spinner mechanism in order to accommodate different shaped boss holes.

3. A spinner apparatus as in claim 2, wherein said spinner-bar means includes means extending on opposite sides of said valve bosses for gripping said sides of said valve bosses.

4. A spinner apparatus as in claim 3, wherein said aligning bar means comprises two members, each being attached to said block and each making contact with the side of said valve disc, said members being positioned 180° from one another about an axis of said elongated centering shaft and said means for adjusting locations of contact points are set screws in each of said two members.

5. A spinner apparatus as in claim 1, wherein said aligning bar means comprises two members, each being attached to said block and each making contact with the side of said valve disc, said members being positioned approximately 180° from one another about an axis of said elongated centering shaft and said means for adjusting locations of contact points are set screws in each of said two members.

* * * * *